United States Patent [19]

Nisonger et al.

[11] Patent Number: 5,147,113
[45] Date of Patent: Sep. 15, 1992

[54] PROPORTIONING BRAKE PRESSURE VALVE RESPONSIVE TO STEERING SYSTEM HYDRAULIC PRESSURE

[75] Inventors: Robert L. Nisonger, Milford; Richard W. Topping, Ann Arbor, both of Mich.

[73] Assignee: General Motors Corporation, Detroit, Mich.

[21] Appl. No.: 718,327

[22] Filed: Jun. 19, 1991

[51] Int. Cl.⁵ .......................... B60T 8/26; B60T 8/24
[52] U.S. Cl. .................................. 303/9.73; 303/9.72; 303/113 AP
[58] Field of Search .................. 303/9.62–9.64, 303/9.67, 9.68, 9.71–9.75, 24.1, 113 AP; 364/426.02; 180/141, 142

[56] References Cited

U.S. PATENT DOCUMENTS

| | | | |
|---|---|---|---|
| 3,706,352 | 12/1972 | Ferguson et al. | 303/9.62 X |
| 3,810,680 | 5/1974 | Schenk | 303/9.74 |
| 3,890,014 | 6/1975 | Hayes | 303/24 |
| 4,012,079 | 3/1977 | Takeshita | 303/6 |
| 4,047,765 | 9/1977 | Ulrich, Jr. | 303/9.68 |
| 4,093,314 | 6/1978 | Kozakai | 303/9.68 |
| 4,111,494 | 9/1978 | Young | 303/9.75 X |
| 4,477,123 | 10/1984 | Schnürer | 303/24.1 |
| 5,024,285 | 6/1991 | Fujita | 303/103 X |

*Primary Examiner*—Robert J. Oberleitner
*Assistant Examiner*—Alfred Muratori
*Attorney, Agent, or Firm*—Ernest E. Helms

[57] ABSTRACT

A brake proportioning valve is provided which can be modified to change the pressure at which the proportioning relationship of the valve initiates action. The valve utilizes the power steering system boost pressure to initiate such modifications of its proportioning function.

3 Claims, 4 Drawing Sheets

PROPORTIONING BRAKE PRESSURE VALVE RESPONSIVE TO STEERING SYSTEM HYDRAULIC PRESSURE

FIELD OF THE INVENTION

The present invention concerns an apparatus and method of utilization thereof of a brake that is variable through the influence of the pressure of the power steering pump.

DISCLOSURE STATEMENT

A proportioning valve is incorporated into a vehicle's braking system to reduce the production of braking forces at the rear of the vehicle with respect to the front, with increasing command pressure. Increased command pressure is related to longitudinal deceleration as braking torque increases with applied pressure. Increasing levels of longitudinal deceleration result in load transfer to the front axle of the vehicle, i.e., load on the front axle of the vehicle increases, and rear axle load decreases. To achieve maximum deceleration capability under all levels of tire/road friction, the braking forces at the front and rear axles should be equal fractions of the vertical load on that axle. Given constant torque/pressure relationships for the brakes, this requires the pressure distribution between the axles to be modified as a function of the longitudinal deceleration. The proportioning valve provides a bilinear relationship between the front and rear pressures to approach the desired front/rear brake balance.

To increase stability while a vehicle is in a combined cornering and braking maneuver it is desirable to provide a means to modify the predetermined (commonly referred to as a knee) pressure at which the proportioning valve actuates. Prior braking systems have attempted to provide such a system by reliance on expensive electronic sensors which can determine vehicle acceleration in a direction transverse (lateral) to the direction of travel. It is desirable to provide a proportional braking system sensitive to vehicle transverse accelerations without reliance on expensive electronic acceleration detectors.

SUMMARY OF THE INVENTION

The present invention provides a brake proportioning valve which can be modified to change the pressure at which the proportioning relationship of the valve initiates action. Additionally, the present invention provides such a valve which utilizes the power steering system boost pressure to initiate such modifications of the proportioning valve.

Power steering boost pressure can be used as an estimate of a vehicle's lateral acceleration. Varying the vehicle's brake distribution as a function of lateral acceleration can yield increased stability during combined cornering and braking maneuvers, while maintaining a high level of braking efficiency during straight line braking.

DETAILED DESCRIPTION OF THE DRAWINGS

Figure 1:
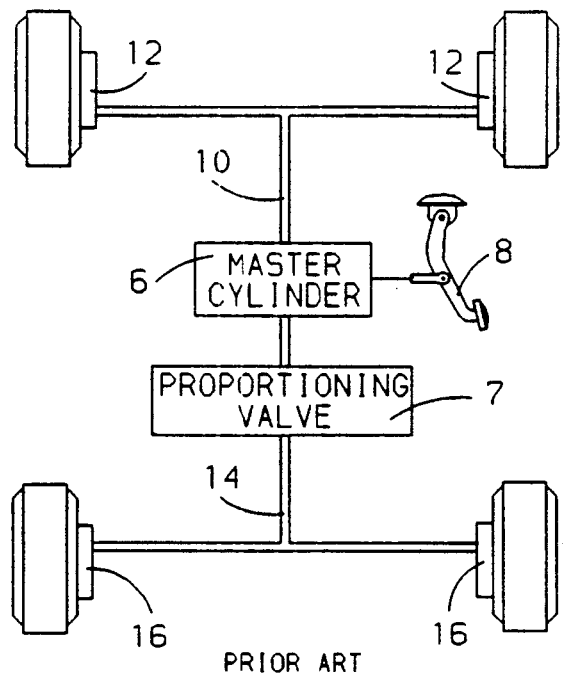
FIG. 1 is a schematic of a vehicle equipped with a prior art vehicle braking system with a proportioning valve.

FIG. 1 is a schematic of an automotive vehicle equipped with a brake system prior to the present invention. A master cylinder 6 is actuated by a pedal 8. The master cylinder 6 will typically have dual chambers with a first line 10 servicing the front brake 12 and a second line 14 to service the two rear brakes 16. Juxtaposed between the master cylinder 6 and the rear brakes 14 is a proportioning valve 7.

In some cars a cross wheel arrangement (not shown) will be utilized where one line of the master cylinder will service the driver side front brake and the passenger side rear brake. The conduit to the rear brake will be teed off from the line leading to the front brake and a proportioning valve will be juxtaposed therein. In like manner will be an arrangement from the front passenger side brake and rear driver's side brake. The cross-tandem arrangement requires two proportioning valves.

Figure 2:
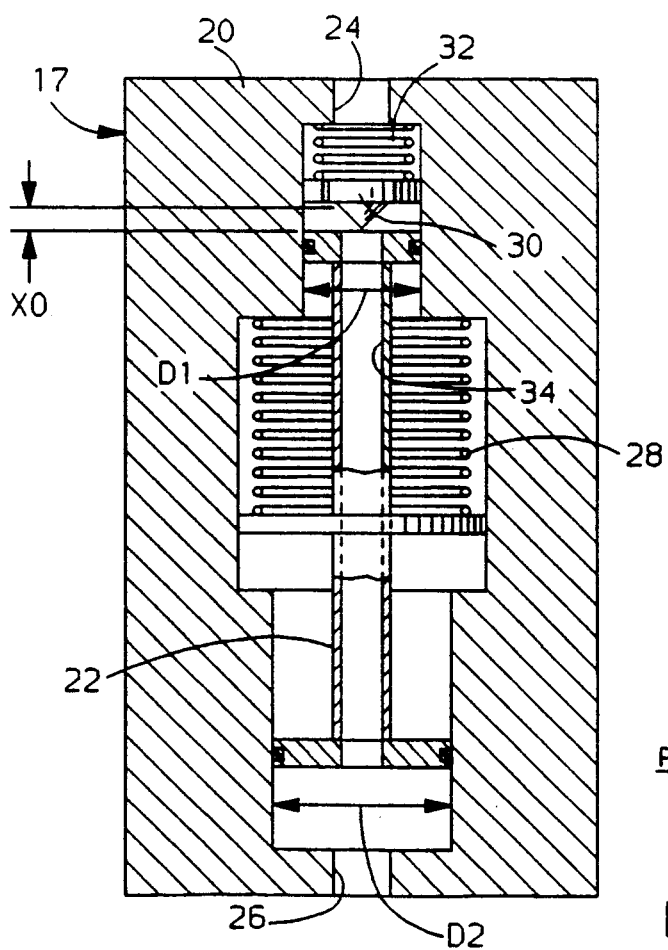
FIG. 2 is a sectional view of a conventional prior art proportioning valve.

FIG. 2 illustrates a previously known proportioning valve 17. The two major parts of a proportioning valve are the valve body 20 which provides the structure to guide and seal the spool 22 in its bore. The spool 22 is hollow to provide passage of brake fluid from the inlet 24 to the outlet 26 under some conditions. The spool is preloaded by a spring 28 toward the outlet. A needle valve 30 located at the inlet is also biased in the direction of the spool by a spring 32.

With no command (master cylinder) pressure, PC, acting on the valve 17, the spool 22 is subjected to a preload force, FP, toward the outlet 26 of the valve by the spring 28. The needle valve 30 is under similar load by its spring 32 against the valve body, and has a clearance, XO, between its rest position and the position where it would seal off the passage through the center of the spool.

The areas of the inlet and outlet sides of the spool are A1 (determined at D1) and A2 (determined at D2), respectively. The spring rate of the spring 28 loading the spool is K1.

The pressure on the inlet 24 and outlet 26 sides of the valve 17 will be nominally equal until the force on the spool 22 causes it to move toward the inlet 24 sufficiently to close off a central passage of the spool. The pressure at which this occurs can be defined by:

$$PU = (FP + K1 \cdot XO)/(A2 - A1) \tag{1}$$

This pressure, PK, is the knee pressure. For pressures above this level, the outlet pressure will not equal the inlet pressure.

For pressures in excess of the knee pressure, the ratio of the rate of change in pressure of the outlet relative to the input, PR, is determined by the ratio of the inlet and outlet spool areas A1, A2.

$$PR = A1/A2 \tag{2}$$

This is due to the force balance on the spool 22 due to pressures on the two sides. Ideally, the force balance is maintained with minimal displacement of the spool 22, and thus minimal fluid displacement. Displacement of fluid on the outlet side 26 of the valve 17 will accompany pressure increases, due to compliance in the brake lines and brake components. This is compensated for by the needle valve 30. As the spool 22 moves toward the outlet 26 as fluid is displaced, the needle valve unseats, allowing fluid to flow through the central passage 34 until the force balance is again attained. This causes the outlet pressure to rise in a series of small steps in response to increases in inlet pressure.

Figure 3:
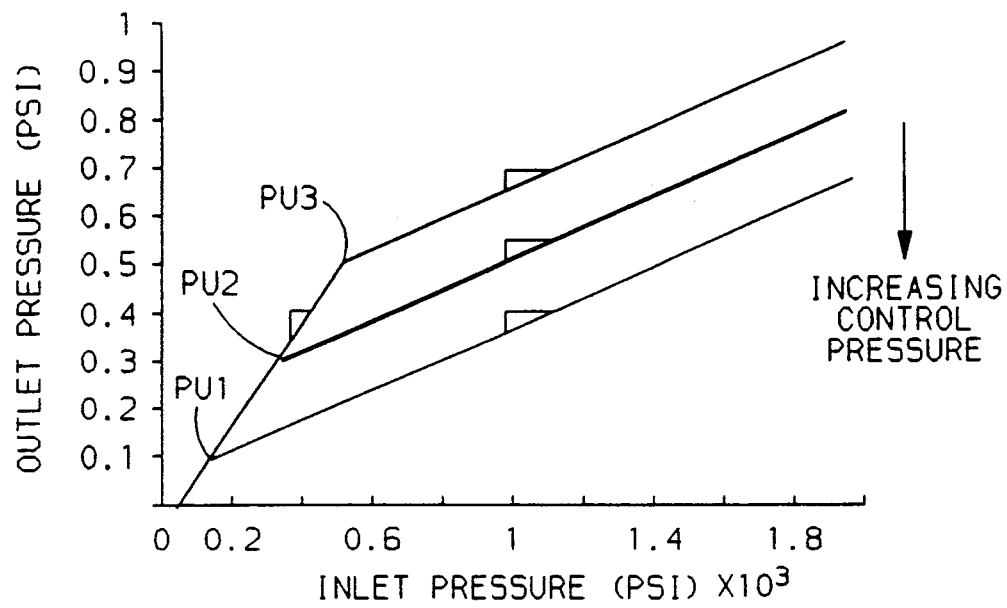
FIG. 3 is a graph illustrating the relationship between the proportioning valve inlet and outlet pressures for the present invention.

Upon release of the inlet pressure, pressure on the inlet side of the spool 22 decreases, and the spool 22 will tend to move toward the inlet 24, decreasing pressure on the outlet 26 side through the volume change. Release of volume from the outlet side is accomplished by the pressure acting on the needle valve through the central passage 34 unseating the needle valve 30 and allowing flow from the outlet 26 to the inlet side of the spool 22. As with flow in the brake application case, this will cause a series of stepwise changes in outlet pressure with respect to inlet pressure, as the needle valve force balance changes. The inlet/outlet pressure relationship is illustrated in FIG. 3 with knee pressure, PU3, for the prior art valve.

BRAKING SYSTEM WITH VARIABLE PROPORTIONING VALVE

Braking while cornering tends to reduce the stability of a vehicle due to the transfer of load from the rear axle to the front axle. This causes the front tires to generate greater cornering forces in response to the increased load, and the rear tires to produce reduced cornering forces in response to the decreased load. The result is an unbalanced yaw moment on the vehicle that tends to increase its yaw velocity, and decrease the turn radius. This tendency is further enhanced by the loss in cornering force at the rear axle that is due to the rolloff in lateral force associated with the braking force developed by the tire.

One approach to decreasing this destabilization is to reduce the braking force on the rear axle to preserve the available cornering force of the rear tires. Decreasing the amount of braking force at the rear axle will reduce the straight line braking efficiency of the vehicle if an invariant braking system is utilized. The above leads to the present invention of a braking system that must be variable with lateral acceleration. The present inventive braking system reduces the amount of braking done with the rear axle as a function of the vehicle's lateral acceleration.

Figure 5:
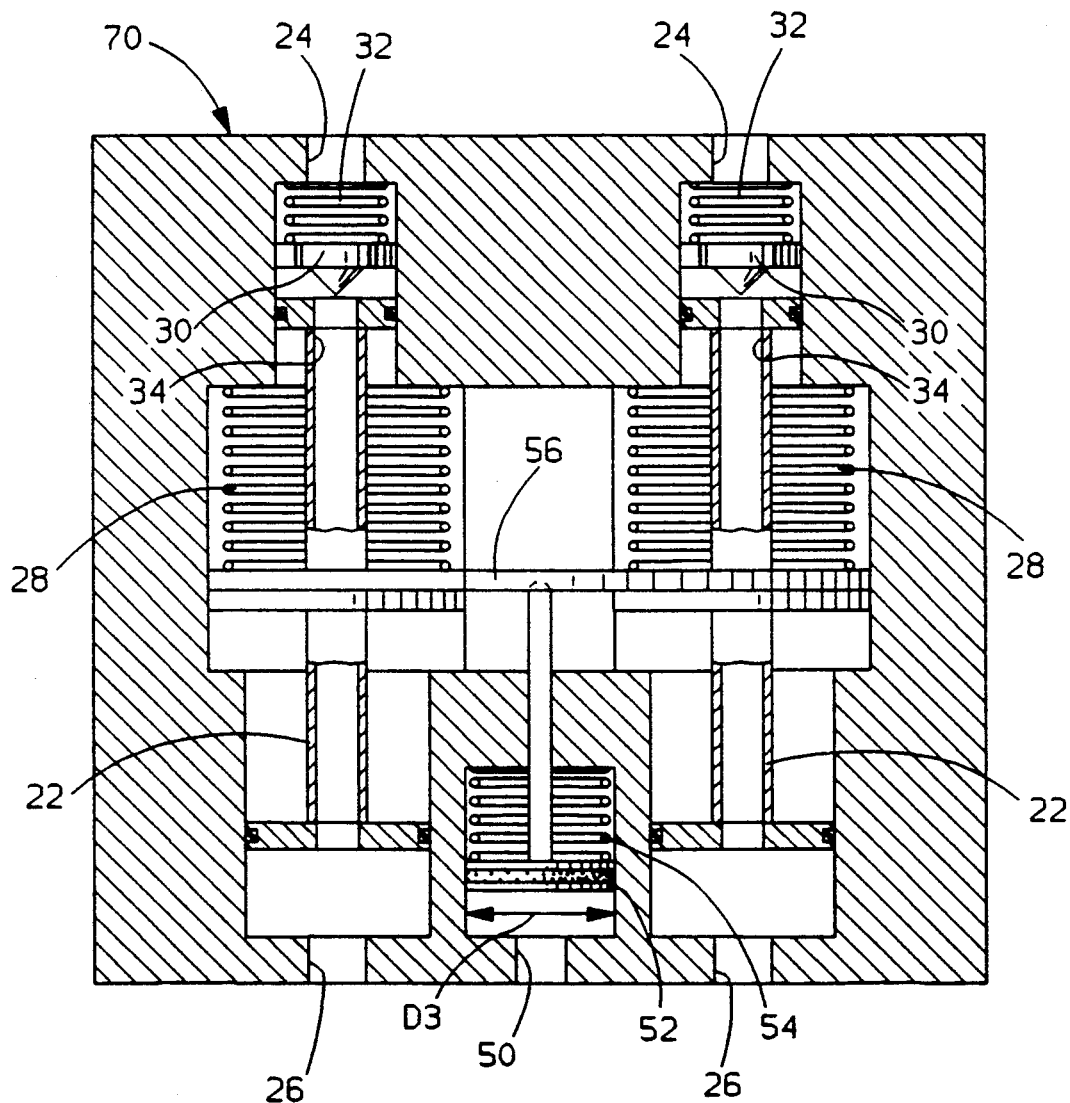
Figure 6:
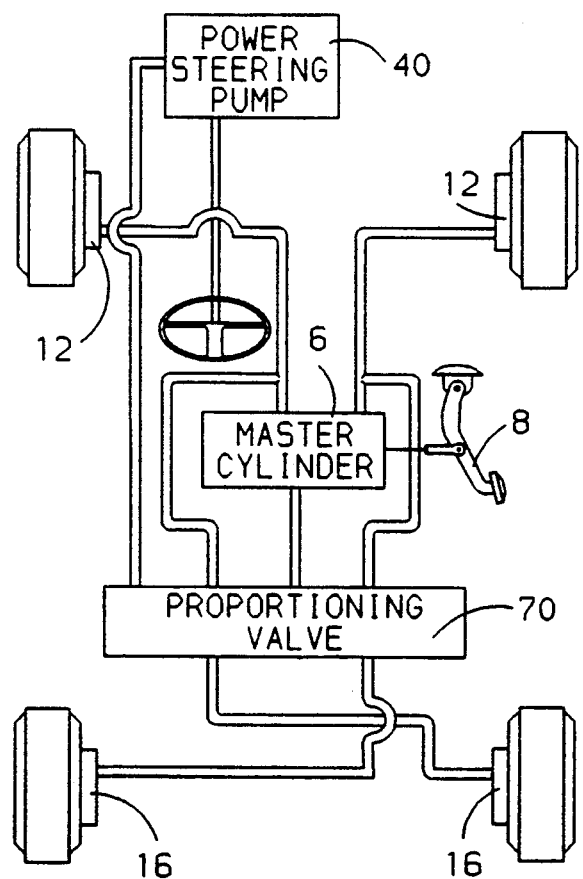
FIG. 6 is a schematic view of a vehicle equipped with a preferred embodiment braking system according to the present invention.

Referring to FIGS. 6 and 5 (items similar to those of FIGS. 1 and 2 are given identical reference numbers) boost pressure generated by a hydraulic power steering system 40 pump can be used as an indicator of a vehicle's lateral acceleration. The power steering system 40 applies a differential pressure across an hydraulic actuator integral to the steering rack, or steering gear, in response to a driver's command. The pressure differential is approximately linearly related to the lateral force seen by the front tires, and therefore to the lateral acceleration of the vehicle in steady state. Use of a shuttle valve between the two sides of the hydraulic actuator will provide a source of pressure that can be used as a surrogate for a lateral acceleration signal or alternatively the back pressure of the hydraulic system can be used.

FIG. 5 illustrates a variable proportioning valve 70 with a knee pressure that is varied by application of pressure from a power steering system. The illustrated valve 70 is applicable to a diagonal split braking system with two proportioning valves, controlling the rear brake pressures based on the diagonally opposite front brake pressure. The components of the two proportioning valves used in this device are the same as described in FIG. 1.

The additional features of the variable proportioning valve 70 are the power steering pressure inlet 50, control piston 52 and the spool yoke 56. The function of the valve 70 is exactly as described previously, except the preload force on the spool is now modified by a control force, FC, applied to the yoke through the control piston. The preload force, FP, on each spool is reduced by FC/2. This modifies the knee pressure to become:

$$PU = (FP - FC/2 + K1*X0)/(A2 - A1) \qquad (3)$$

The control force is a function of the applied pressure from the power steering, PB, the control piston area, A3 determined at D3, and the preload, FPC, of the spring 54 the control piston bore. No control force, FC, is applied to the yoke until the spring preload, FPC, is overcome. The pressure required, PO, is:

$$PO = FPC/A3 \qquad (4)$$

For applied pressures in excess of PO, the control force is a function the applied pressure, PB, control piston area, A3, the control piston spring 54 rate, K3, and the displacement of the control piston, XC. The control force, FC, applied to the yoke 56 is:

$$FC = (PB - PO)*A3 - K3*XC \qquad (5)$$

for PB>PO

The displacement of the system is zero for control forces up to the total preload force on both spools 22. This assumption reduces equation 5 to:

$$FC = (PB - PO)*A3 \qquad (6)$$

for PB>PO and FC<2*FP

From equations 3 and 6, the knee pressure, PK, decreases in a linear fashion with increasing applied boost pressure, PB, for PB greater than PO.

For the case when the control force, FC, exceeds the total preload on the spools, the control piston/yoke assembly will move toward the inlet side 24, removing the preload from the spools 22. In this situation, the yoke displacement, XC, becomes:

$$XC = (PB - PO)*A3/(2*K1 + K3) \qquad 7)$$

for FC>2*FP

Displacement of the yoke 56 away from the spools is equivalent to decreasing the gap between the spool 22 and needle valve 30, XO, by the yoke displacement, XC. Thus, the knee pressure can be reduced to near zero by inducing a displacement of the yoke, XC, of XO. This results in the center passage being blocked for an input pressure that overcomes the spool friction.

Variations in the outlet vs inlet pressure relationship with applied pressure are illustrated in FIG. 3.

With this device, the vehicle's brake balance for straight line braking can be set to achieve the desired braking efficiency with less compromise of the vehicle's stability during combined cornering and braking maneuvers. The knee pressure for the proportioning valve can be reduced (in an infinitely variable fashion) with increasing steering boost pressure relating to increasing lateral acceleration. The level of change in the knee pressure can be controlled by the area of the control piston 52 and the spring 54 preload. Thus, the straight line and cornering brake balance requirements can be addressed independently.

POSSIBLE VARIATIONS

Figure 4:
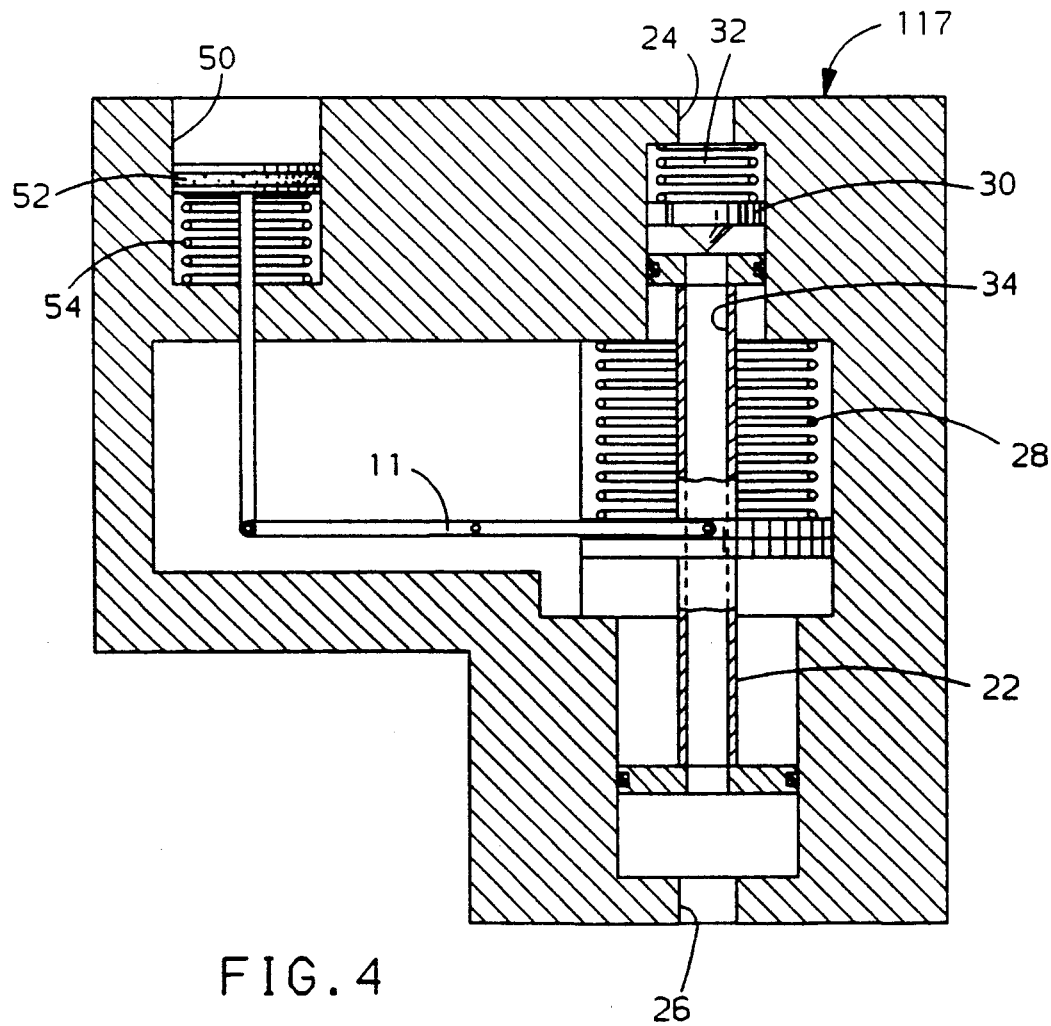
FIGS. 4 and 5 are sectional views of preferred embodiments of the present invention.

For vehicles equipped with a single proportioning valve, a variable proportioning valve 117 of the type shown in FIG. 4 can be utilized (similar components to FIG. 5 are given common reference numbers). The principle of operation is the same as previously discussed, with the exception of the addition of a lever, 11, to apply the control force to the spring 28 in the proportioning valve 117. This introduces the lever ratio, R, into the equations governing the valve function, where R is the ratio of the force applied to the preload spring, to the force exerted by the control piston 52, on the lever, 11. Equations 4 and 5 hold for this case, with FC defined as the force exerted by the control piston 52, on the lever, 11. The boundary conditions change for equation 6 due to the lever ratio, R, and the single proportioning valve:

$$FC = (PB - PO) * A3 \quad (8)$$

for $PB > PO$ and $FC < FP/R$

Similarly, the displacement of the control piston, XC, changes with this variation, equation 7 is replaced by:

$$XC = (PB - PO) * A3 / (K1/R + K3) \quad (9)$$

for $FC > FP/R$

The knee pressure, PK, becomes:

$$PU = (FP - R*FC + K1*XO)/(A2 - A1) \quad (10)$$

While a few of the embodiments of the present invention have been explained it will be readily apparent to those skilled in the art of the various modifications which can be made to the present invention without departing from the spirit and scope of this application as it is encompassed by the following claims.

We claim:

1. A braking system for an automotive vehicle comprising:
   a first fluidly activated brake; a second fluidly activated brake;
   master cylinder means for supplying pressurized fluid to the first and second brakes;
   a powered hydraulic steering system responsive to a vehicle operator command for steering the vehicle;
   means for proportioning the pressurized fluid delivered by the master cylinder to the first and second brakes at a first given ration up to a first predetermined pressure and thereafter at a second given ration above the first predetermined pressure;
   and means for sensing a hydraulic pressure within the steering system and providing a signal corresponding thereto; and
   means responsive to the steering system hydraulic pressure for operational association with the proportioning means to modify the predetermined pressure of the proportioning means.

2. A vehicle braking system as described in claim 1 wherein said first brake is operatively associated with a front wheel of the vehicle and the second brake is operationally associated with a rear wheel of the vehicle.

3. A method for braking an automotive vehicle having at least two hydraulically activated brakes, the method comprising:
   supplying pressurized fluid to the brakes by a master cylinder;
   powering a vehicle steering system in response to a vehicle operator's command with a hydraulic steering system;
   proportioning the pressurized fluid via a proportioning means, said pressurized fluid delivered to first and second brakes at a first given ratio up to a first predetermined pressure and thereafter at a second given ratio above the first predetermined pressure;
   sensing a hydraulic pressure within the steering system and providing a signal corresponding thereto; and
   modifying the predetermined pressure of the proportioning means in response to the signal given corresponding to the pressure of the hydraulic steering system.

* * * * *